United States Patent [19]

Mix et al.

[11] Patent Number: 5,202,198
[45] Date of Patent: Apr. 13, 1993

[54] BATTERY CONSTRUCTION AND METHOD OF CONNECTING TERMINALS TO ELECTRODES

[75] Inventors: Renard E. Mix, Yorktown; George W. Brutchen, Winchester, both of Ind.

[73] Assignee: General Motors Corporation, Detroit, Mich.

[21] Appl. No.: 858,054

[22] Filed: Mar. 26, 1992

[51] Int. Cl.⁵ .............................................. H01M 2/24
[52] U.S. Cl. ................................. 429/160; 29/623.1; 29/731; 429/161
[58] Field of Search ............... 429/149, 152, 161, 160, 429/178, 179; 29/623.1, 731; 219/55, 91.23, 6.5, 9.5, 137 R; 228/58

[56] References Cited

U.S. PATENT DOCUMENTS

| | | | |
|---|---|---|---|
| 3,841,915 | 10/1974 | Eberle | 429/160 |
| 4,675,991 | 6/1987 | Byers | 29/623.1 |
| 4,683,180 | 2/1987 | Bish et al. | 429/160 X |

OTHER PUBLICATIONS

G. W. Vinal, Sc.D, *Storage Batteries*, Fourth Edition, John Wiley and Sons, Inc., New York, N.Y. (date unknown), p. 70.

*Primary Examiner*—Anthony Skapars
*Attorney, Agent, or Firm*—Lawrence B. Plant

[57] ABSTRACT

A lead acid storage battery and method of making same wherein a plurality of plate lugs are welded to a plate strap while a bed of insulating particulates (e.g., glass beads) at the roots of the lugs underlie the strap during welding to insulate the battery case from heat and prevent molten lead from entering the container.

7 Claims, 4 Drawing Sheets

BATTERY CONSTRUCTION AND METHOD OF CONNECTING TERMINALS TO ELECTRODES

TECHNICAL FIELD

This invention relates to electric charge storage batteries and more particularly to a new and improved battery featuring a unique welded connection between internal electrodes layered in the battery case and a conductive strap joining those electrodes. This invention further relates to a new an improved method of connecting a plurality of electrodes to battery plate straps and terminals.

BACKGROUND OF THE INVENTION

Prior to the present invention bi-polar lead-acid and other electric charge storage batteries have been made with positive and negative electrode plates interleaved in the cells of the battery. A first end cell of the battery may have positive electrode plates with projecting lugs that are joined to a connector strap of a positive battery terminal of a lead based alloy (hereafter lead). Another end cell of the battery may have internal negative electrode plates with projecting lugs that are joined to the connector strap of an external negative terminal usually identical to the positive terminal. Similarly, the positive plates of intermediate cells (i.e., between the end cells) are likewise joined with a positive plate strap which in turn is connected to a negative strap in the next adjacent cell via an intercell connector. This lug-strap connection is generally made by arc welding, torch flaming the straps, until the strap material amalgamates or fuses with the material of the lugs. This fusing is generally done with the use of comb-like containers/tooling installed over, and interdigitating with, the lugs prior to their fusion with the strap to prevent strap material from flowing between and short circuiting the interleaved positive and negative plates resulting in the scraping and recycling of the electrode assembly. Alternatively, the strap may be cast directly in place using the so-called "cast-on-strap" process wherein the lugs are positioned in a mold on molten lead cast thereabout. Generally, the assembly of the straps and plates is made outside of the battery case and is and then inserted in the battery case. An electrolyte is then added and the case is subsequently sealed to prevent electrolyte leakage.

The present invention contemplates a unique method of joining plate lugs to a precast plate strap. The invention shall hereafter be described in conjunction with joining the plates in the end cell of a battery to a battery terminal, but is not restricted thereto. Rather the process is equally applicable to joining the plates of intermediate cells to plate straps destined for coupling to other plate straps in contiguous cells of a multicell battery. In a preferred embodiment of the terminal-electrode plate welding of the present invention the positive and negative electrode plates are interleaved in their respective cells with the plates interlayered with glass mat separators. The plates and separators are within a battery case of a heat sensitive material such as polypropylene. The negative electrode plates are identical and have lugs extending through a slotted pocket in one wall of the battery case. Similar lugs of the positive electrode plates extend through a slotted pocket in another wall of the case. Subsequently, small beads of glass, or other suitable particulate insulating material (e.g., cut glass fibers, polypropylene particle, sand, etc.), are fed and vibrated, or brushed into one of the slots through which the lugs of one set of the electrode plates extend. These beads form a bed of predetermined thickness which tightly nest around and between the lugs to provide a barrier or seal so that during welding the molten lead-based metals of the strap and upper portions of the lugs will not flow into areas of the interleaved positive and negative plates. This effectively eliminates short circuit between adjacent plates. Before welding, the extending lugs and terminal strap are appropriately fluxed (e.g., with a powdered Azelaic acid) so that the strap burn or weld zone is accordingly fluxed to assure a clean surface for optimization amalgamation of the lugs and the strap. By special alignment and insulation construction associated with the wall of the casing, the terminal is accurately positioned on with the plate strap portions overlying the lugs. Thereafter an induction coil is lowered into contact with the strap and into a burn position. The coil is energized at a predetermined percent of induction generator power (e.g., 85-90% depending on the size of power unit) for a predetermined time, six seconds for example, so that the strap and upper portions of the lugs are fused together. After the burn, the coil is removed and the strap and lug amalgamation area is allowed to completely solidify to complete the connection of the first terminal to the plates of one polarity (e.g., negative).

The battery is then turned so the unburned lugs are upright or otherwise accessible and the process is repeated to affix a terminal to the second row of lug of the other electrode plates.

These and other features, objects and advantages of the invention will become more obvious from the following detailed description and drawings in which:

BRIEF DESCRIPTION OF THE INVENTION

FIG. 6 is an enlarged side sectional view taken in the direction 6—6 of FIG. 4.

DETAILED DESCRIPTION OF THE DRAWINGS

Figure 1:
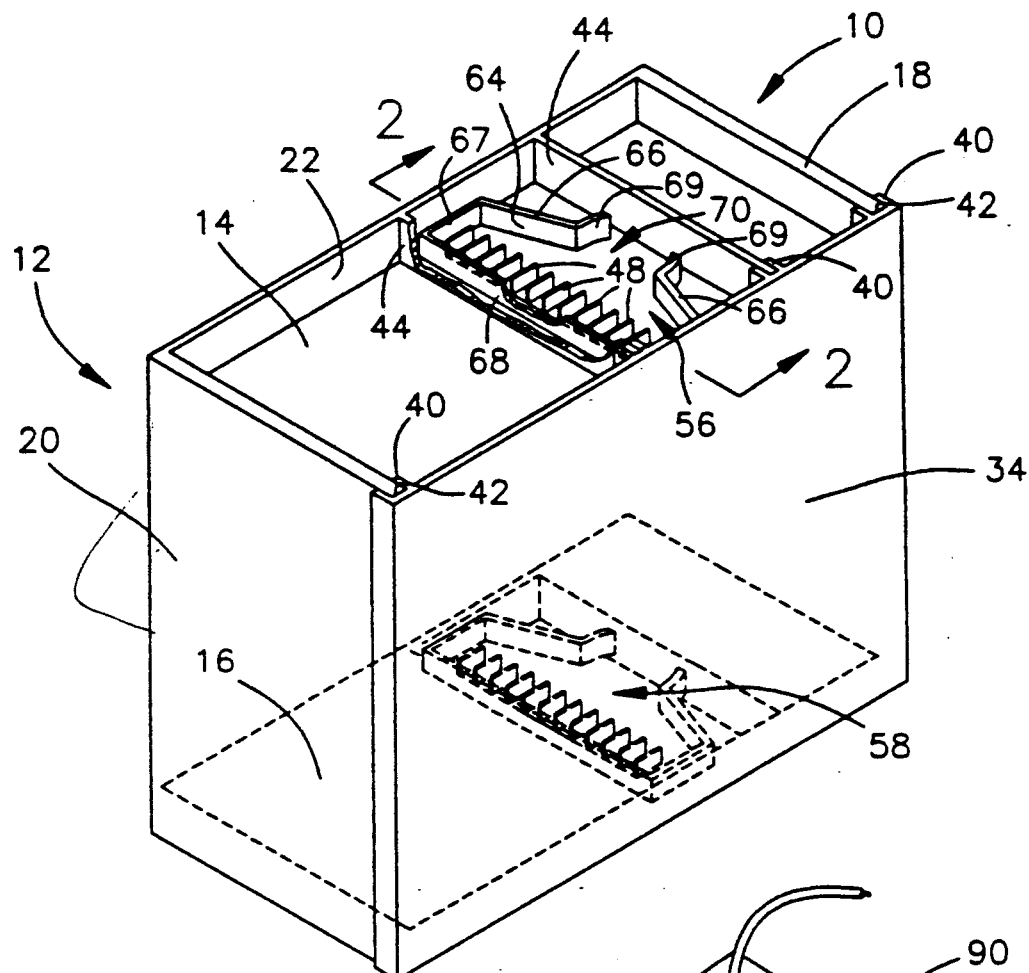
FIG. 1 is a pictorial view of a portion of a bi-polar battery case prior to the installation of the positive and negative terminals to the lugs of the positive and negative electrode plates.

Turning now in greater detail to the drawings, there is shown in FIG. 1 a portion of a three cell, bi-polar battery 10 having a box like case of polypropylene or other suitable plastic material. The case comprises a main body 12 rectilinear in configuration with top and bottom end walls 14 and 16, side walls 18 and 20 and a base wall 22. After the cells of the main body have been packed with a cell element comprising glass mat separators 24 separating interleaved electrode plates, such as negative charge plates 26 and positive charge plates 28 in the upper cell, and the negative charge plates 30 and positive charge plates 32 in the lower cell, a cover plate 34 opposite to the base wall 22 is secured to the main body.

As shown, the cover plate is formed with spaced pairs of elongated ribs 40 at predetermined positions along the width thereof to provide grooves 42 for receiving and fluid sealing securement to the leading edges of the side walls 18, 20 and the intermediate reinforcing walls 44. The interfaces of the cover plate 34 with the top and bottom end walls are also fluid sealed so that the case will not leak the electrolyte which is added at an appropriate time to the battery to make it electrically operative.

Figure 1A:
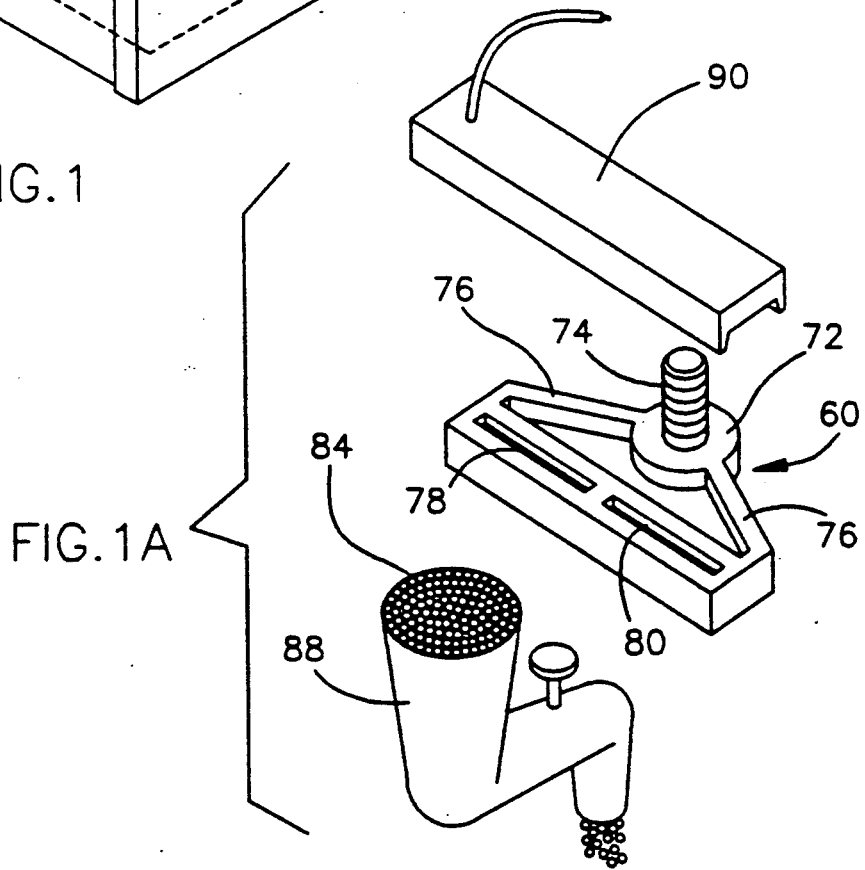
FIG. 1a is a pictorial view of a preformed battery terminal, glass bead supply and an induction coil for use in manufacturing the battery of this invention.
Figure 1B:
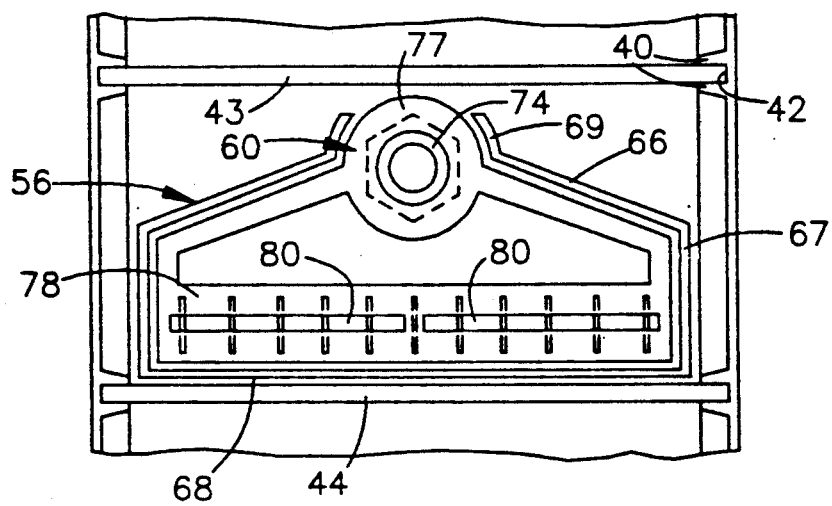
FIG. 1b is a top view of a portion of the battery case of FIG. 1 with the terminal of FIG. 1a installed thereon.
Figure 2:
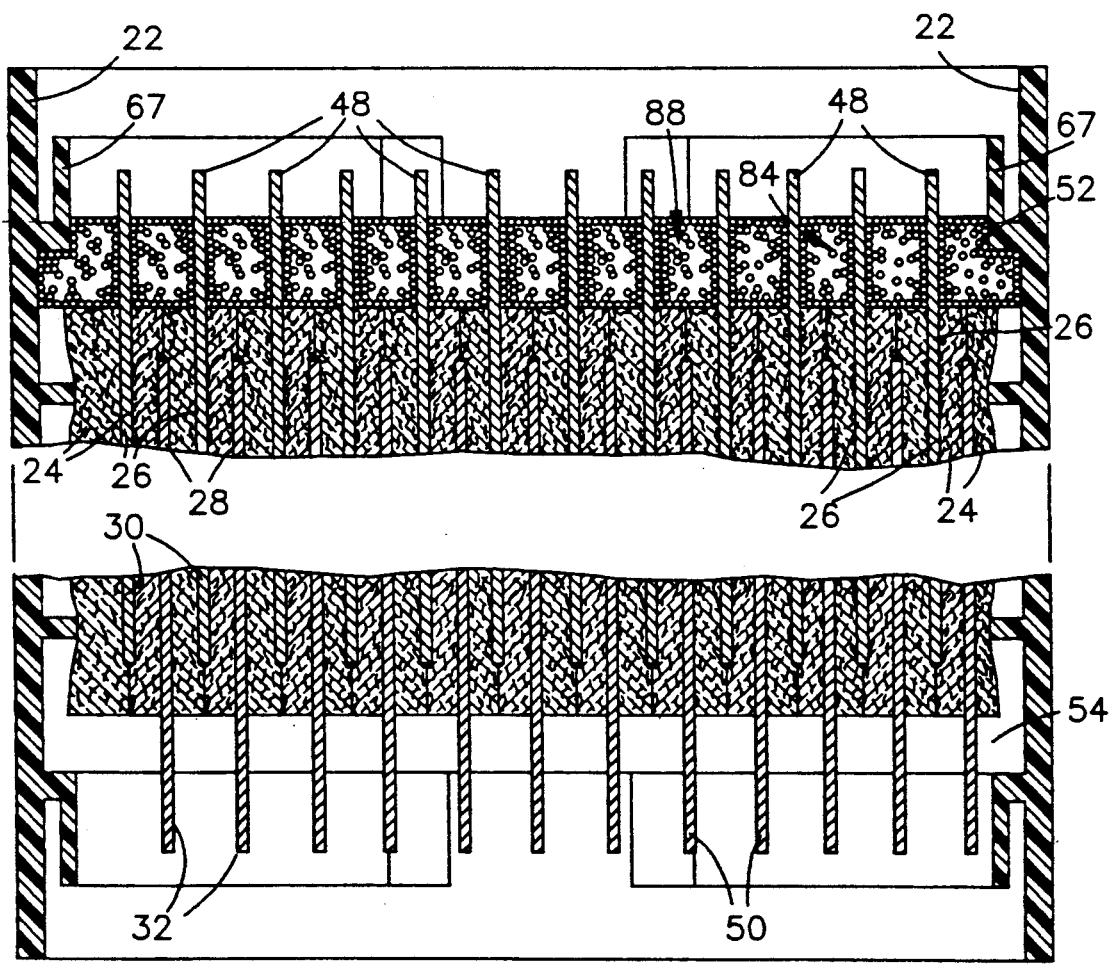
FIG. 2 is a cross sectional view of the battery case taken generally along sight lines 2—2 of FIG. 1 and after the glass beads have been added.
Figure 5:
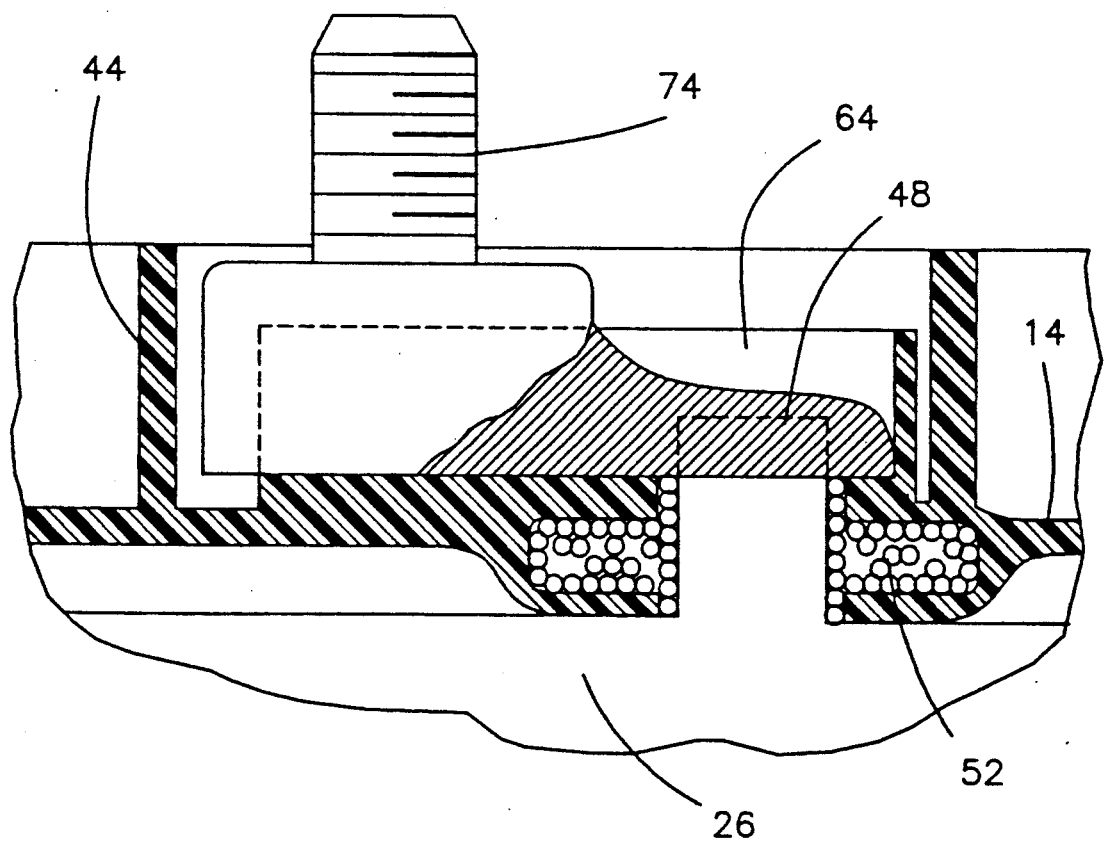
FIG. 5 is a cross sectional view taken along sight lines 5—5 of FIG. 4.

As shown in the drawings, and particularly FIG. 2, the negative electrode plates 26 adjacent to the top end wall and the positive electrode plates 32 adjacent to the bottom end wall are respectively made with lugs 48 and 50 which extend through slotted pockets 52 and 54 centrally formed in the opposite end walls of the case along the widths thereof. FIG. 5 shows slotted pocket 52 in cross section and pocket 54 is similarly formed. In addition to the slotted pockets 52, 54, the top and bottom end walls are formed with an integral insulator sections 56, 58 for receiving and locating the preformed lead based battery terminals, such as terminal 60 shown in FIGS. 1a and 1b, to protect the plastic battery case from heat damage while the terminal and particularly the connector straps 72 thereof are being burned and fused to the lugs. The insulator sections further accurately position the terminals, the associated plate lugs and insure that the terminal post fasteners are positioned with precision.

The insulator sections 56 and 58 are the same details so only insulator section 56 is described in some detail. Preferably the insulator section 56 is integral with the case although it may be a separate piece. Section 56 comprises a containment wall 64 extending around the pocket 52 and adjacent portions of the end wall 14 that is configured to fit with some small clearance around the outer periphery of the terminal 60. The containment wall 64 is generally polygonal in shape but has converging wall segments 66 extending from end arms 67 of a back wall 68 that terminate in arcuate end portions 69 that cooperatively form a cup 70 to receive a cylindrical end portion 72 of the terminal 60 in which the head of an upstanding a threaded terminal post fastener 74 is embedded.

Figure 3:
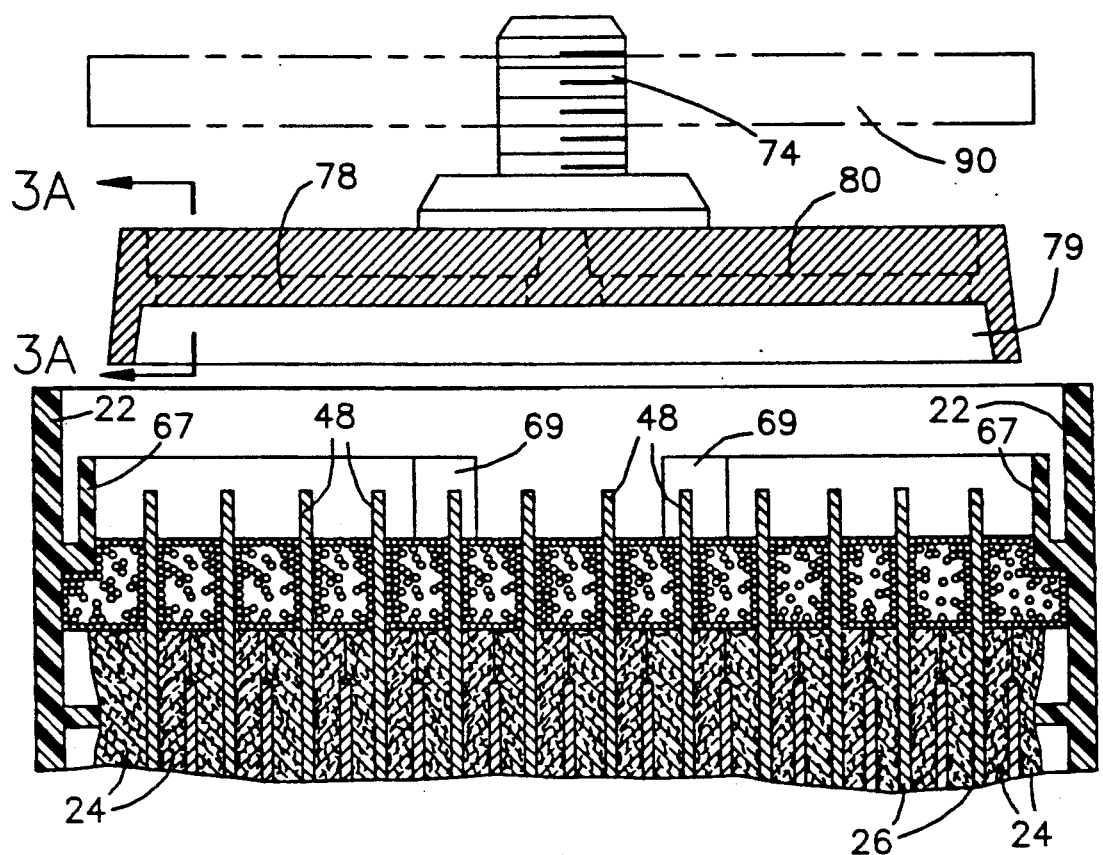
FIG. 3 is a view similar to the upper portion of FIG. 2 showing the terminal of FIG. 1a being installed on the case.
Figure 3A:
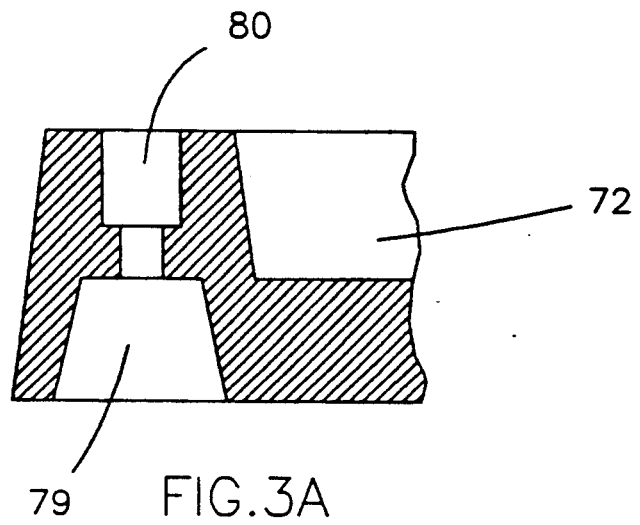

In its preform configuration, the terminal 60 has connector arms 76 diverging from the cylindrical end portion 72 which connect to opposite ends of a linear strap portion 78 which is formed with recess 79, as best shown in FIGS. 3 and 3a, to receive the end portions of the rank of lugs 48 of the negative electrode plates 26. The strap 78 is formed with elongated venting slots 80 which allow the escape of gases when the lead terminal is welded to the upper ends of lugs 48.

In the preferred embodiment of this invention, the premolded lead terminal 60 is guided by the insulator section 56 into seated position within the confines of the peripheral walls thereof. The hollow elongated open recess 79 of the strap 78 closely fits over and heat shields the top of the row of lugs 48 which are to be heated and fused to the strap of the terminal.

Before the premolded terminal is placed in the insulator section however, a quantity of small diameter spherical, glass beads 84, or the like, is poured into the slot and pocket 54 to make an insulating bed of a sufficient thickness to effectively block the flow of molten lead into the interior of the case to possibly short circuit the electrode plates.

In this regard, FIG. 1a shows a container 88 into which a quantity of glass beads 84 has been loaded. These beads are selectively fed from the container into the pocket 52 so that, with accompanying vibration of the case or by brushing of the beads, the pocket is filled and the bed is tightly packed around a portion of the lugs. With the beads supported by the upper ends of the separators 24 and tightly packed into the pocket, a block or seal is made which insulates the electrode plates from the strap 78 and prevents the leaking of strap material into the battery's cell elements during welding. With this bed, the lugs are also supported in their upright position by one another and by the side walls of the battery case so that improved amalgamation of the lugs and straps can be obtained. After the bed of glass beads has been prepared, the upper end portions of the lugs extending above the bed and the inner surface of the strap 78 are fluxed with a powdered azelaic acid, or other suitable material, so that oxides otherwise formed during heating are absorbed and this cleaning optimizes their subsequent fusion.

After fluxing, the premolded terminal 60 is placed in position on the insulator portion of the upper end of the battery case with the recessed strap 78 receiving and shielding the lugs 48 while providing the lead, or other metal as used, for the lug-strap connection.

After the terminal 60 is positioned on the battery case, the battery is positioned in a station where it is clamped or otherwise held for the burning operation. After this positioning, induction coil 90 is moved into a burn position with the induction coil nesting over the strap portion 78 of the lead terminal 60.

Figure 4:
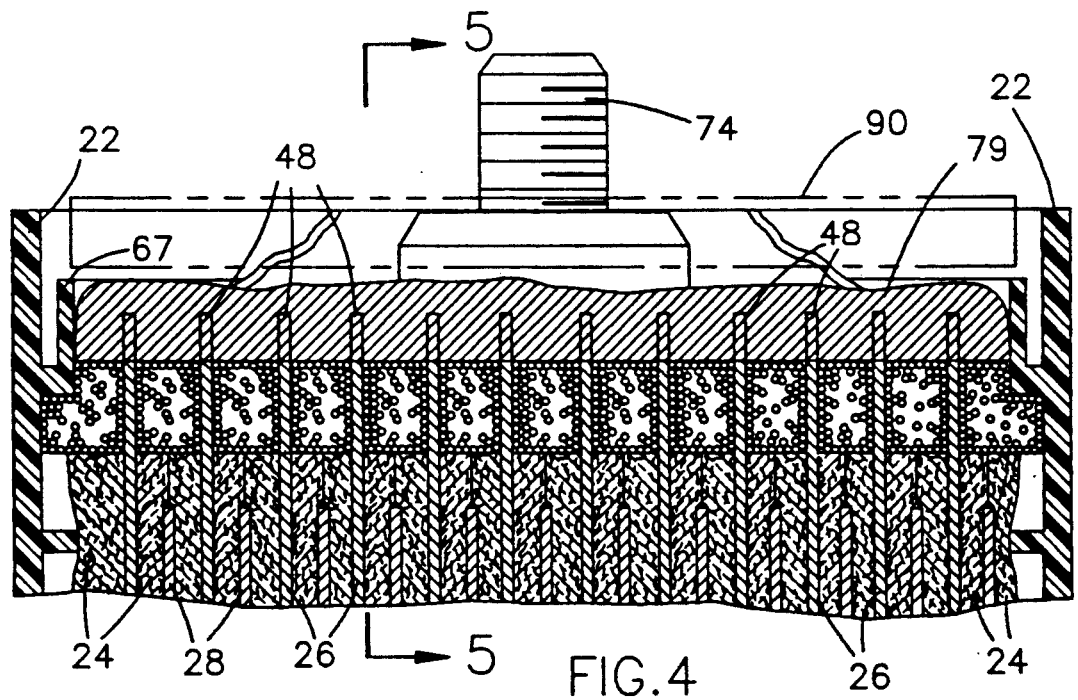
FIG. 4 is a view similar to the view of FIG. 3 showing the burning of the terminal to the lugs of the electrode plates.

The induction coil 90, which may be a component of an induction system such as the "Taylor Winfield Induction Welder", is energized for a predetermined time, such as six seconds at 85-90% of induction generator power, to heat the strap and lugs to 750° F., for example, to make a good weld or burn. After the burn is made and with the strap and upper ends of the upstanding lugs sufficiently molten, they fuse together. The melt also fills the area between the strap and arms 76 of the premolded terminal, as best shown in FIGS. 4 and 5.

During the burning, the strap material becomes molten and flows onto the bed provided by the glass beads which importantly isolate the heat energy and prevent molten lead from flowing into the area of the interleaved positive and negative terminals to eliminate short circuiting of any portion of the battery electrodes.

After the first burn is completed, the strap 78 of the terminal 60 and the lugs are allowed to cool and solidify for about one second to complete the connection. After this burn and resultant amalgamation has taken place, the induction coil is removed from the terminal and away from the battery case which has not been distorted or otherwise heat damaged by the welding process. The battery is then subsequently turned 180° so that the unburned lugs appear on the top end of the battery case and the disclosed process is repeated so that the positive preformed terminal can be welded to the lugs of the positive electrode plates without short circuits and without heat damage to the battery case.

While the above description constitutes preferred embodiments of the invention, it will be appreciated that the invention can be modified and varied without departing from the scope of the accompanying claims.

We claim:

1. A method of joining laterally spaced lead-based electrode plates that are mounted in a battery case of heat sensitive material and that have laterally spaced metallic lugs extending from one end thereof through slot means in the wall of said case to an elongated lead strap having recess means for receiving said lugs, comprising the steps of:
   a. placing a heat insulating particulate in said slot means and between the laterally spaced lugs in sufficient quantity to form a molten lead barrier and heat insulating bed of particulate separating the interior of the case from the exterior thereof, said bed lying adjacent the roots of said lugs proximate said plates so as to leave distal portion of said lugs extending above said bed for fusing to said strap,
   b. placing said strap on said distal portion of said lugs extending above said bed to the exterior of said wall of said case,
   c. applying sufficient heat energy to said strap to melt and fuse said strap and said distal portions together;
   d. terminating the application of heat energy to said strap, and
   e. allowing said strap and said distal portions to solidify so that said plates are physically connected to said strap.

2. A method of making a terminal for laterally spaced lead-based electrode plates mounted in a battery case of a heat sensitive material, said electrode plates having metallic lugs extending through slot means formed through a wall of said case, comprising the steps of:
   a. providing a premolded electric terminal having a lead connector strap including a recess for receiving said lugs,
   b. placing heat insulating material in said slot means between the laterally spaced lugs so that a heat insulating bed of said material is formed around a portion of said lugs where they extend through said slot means, said bed serving to prevent molten lead from entering said case during welding,
   c. installing said strap on the wall of said case so that said lugs are located within said recess,
   d. heating said strap sufficiently to cause said strap and the portion of said lugs within said recess to melt and fuse together,
   e. terminating said heating, and
   f. allowing said strap and said lugs to solidify and bond together so that said plates are connected to said terminal.

3. A method of fusing a premolded lead battery terminal strap to the upstanding lugs of a group of electrode plates mounted in a heat sensitive battery case which lugs extend from the battery electrode plates through a particulate formed in a wall of said battery case comprising the steps of:
   a. placing sufficient heat insulating particulates into said slot to substantially fill said slot, surround lower portions of said lugs proximate said plates and leave distal portions of said lugs remote from said plates projecting above said material,
   b. applying a flux to the distal portions of said lugs and to a portion of said terminal strap to clean and prepare said distal portions and strap portion for amalgamation,
   c. positioning said strap over said lugs so that said fluxed portions are adjacent to one another,
   d. heating said strap sufficiently to melt the fluxed portions of said strap and said lugs so that said strap material fuses with said lugs,
   e. discontinuing said heating and allowing said strap and said lugs to cool and solidify.

4. A lead-acid storage battery comprising a case having walls of a heat sensitive plastic material, a first group of laterally spaced leady plates having a first polarity mounted in said case, a second group of laterally spaced leady plates of opposite polarity interleaved with said first group of plates, separator means for separating said plates one from the other, an elongated slot through a wall in said case, said plates of said first group each having a lug extending therefrom through said slot to define a file of laterally spaced lugs in said slot, a bed of heat-insulating and molten-lead-barrier particulates disposed in said slot and around each of said lugs and a lead plate strap fused to the lugs of each of said groups of plates, said bed serving to insulate said wall from heat and prevent molten lead from entering said container while said plate strap is being fused to said lugs.

5. The battery according to claim 4 wherein said plate strap joins said lugs to a terminal of the battery.

6. The battery of claim 4 wherein said plate strap has vent slots extending therethrough said strap prior to fusion to allow the escape of gasses from the fusion zone during fusing.

7. A battery comprising a case of a heat sensitive material and having walls defining a container,
   said case having a plurality of alternately interleaved positive and negative polarity electrode plates operatively disposed each separated one from the other by an electrolyte absorbing mat,
   a set of said plates of one polarity being formed with lugs extending from said plates,
   a slotted pocket in a wall of said case through which said lugs extend,
   said mat lying adjacent said pocket,
   a heat resistive particulate disposed in said pocket to seal said case against passage of heat and material to and into said case during welding, and terminal strap means welded to said lugs.

* * * * *